Sept. 28, 1954            C. JOHNSON            2,690,532

RECORDED MOTOR CONTROL SYSTEM

Filed May 18, 1949            7 Sheets-Sheet 1

INVENTOR.
CLARENCE JOHNSON
BY Raymond W. Junkins
ATTORNEY

Sept. 28, 1954  C. JOHNSON  2,690,532
RECORDED MOTOR CONTROL SYSTEM
Filed May 18, 1949  7 Sheets-Sheet 2

INVENTOR.
CLARENCE JOHNSON
BY
Raymond H. Junkins
ATTORNEY

Sept. 28, 1954  C. JOHNSON  2,690,532
RECORDED MOTOR CONTROL SYSTEM
Filed May 18, 1949  7 Sheets-Sheet 4

*INVENTOR.*
CLARENCE JOHNSON
BY
Raymond D. Jenkins
*ATTORNEY*

Sept. 28, 1954  C. JOHNSON  2,690,532
RECORDED MOTOR CONTROL SYSTEM
Filed May 18, 1949  7 Sheets-Sheet 5

INVENTOR.
CLARENCE JOHNSON
BY
*Raymond W. Junkins*
ATTORNEY

Sept. 28, 1954  C. JOHNSON  2,690,532
RECORDED MOTOR CONTROL SYSTEM
Filed May 18, 1949  7 Sheets-Sheet 6

INVENTOR.
CLARENCE JOHNSON
BY
Raymond W. Jenkins
ATTORNEY

Sept. 28, 1954   C. JOHNSON   2,690,532
RECORDED MOTOR CONTROL SYSTEM
Filed May 18, 1949   7 Sheets-Sheet 7

INVENTOR.
CLARENCE JOHNSON
BY
Raymond D. Junkins
ATTORNEY

Patented Sept. 28, 1954

2,690,532

UNITED STATES PATENT OFFICE 2,690,532

RECORDED MOTOR CONTROL SYSTEM

Clarence Johnson, South Euclid, Ohio

Application May 18, 1949, Serial No. 93,871

16 Claims. (Cl. 318—162)

My invention relates to method and means for the storing and reproduction of intelligence, and more particularly for the storing and reproduction of programmed control signals.

The invention lies in the art of magnetic wire recording which has provided machines wherein sound is recorded magnetically on a moving filament such as a paramagnetic wire subjected to a magnetic field varied in accordance with a sound wave to be recorded. Thereafter the sound wave may be reproduced by subjecting a pick-up device to the magnetic field emanating from the permanently magnetized wire as the latter is moved at recording speed past the pick-up device. The elongated recording medium may be in the form of wire, metallic tape, magnetic paper tape, or the like, although certain forms provide advantages as compared to others. Various forms of transducer heads, erasing heads, reproducing pick-ups, reel winders, and other apparatus have been invented and are known in this art.

I believe that I am the first one, however, to consider the permanently magnetized elongated member as a cam or program cam useful in machine or similar operations in place of known mechnaical cams or program means, and having many advantages thereover. I have conceived of method and means for so magnetizing an elongated medium that the magnitude, or rate of change in magnitude, of magnetization along the length of the medium varies in accordance with a predetermined pattern or program, to the end that it is in the nature of a cam or pattern which may be reproduced many times with high fidelity.

The invention is readily adapted to the control of machine tools to the end that large quantities of an article may be replicas of a desired shape. Or the invention may be included in the control of processes to program a series of operations or the like. In similar manner it may be useful in sequential operations upon an object or assembly, or in the assembly or packaging of articles. In fact, it is useful in most systems or operations which have in the past found use for cams, cam action, programming, sequential operation, or the like. Broadly the invention pertains to the storing upon a magnetizable elongated member of desired cam or program intelligence useful in the control of operations or the like. So far as I am aware no one has previously used this method and apparatus in the control of motion, actions, operations, or the like.

Figure 9:
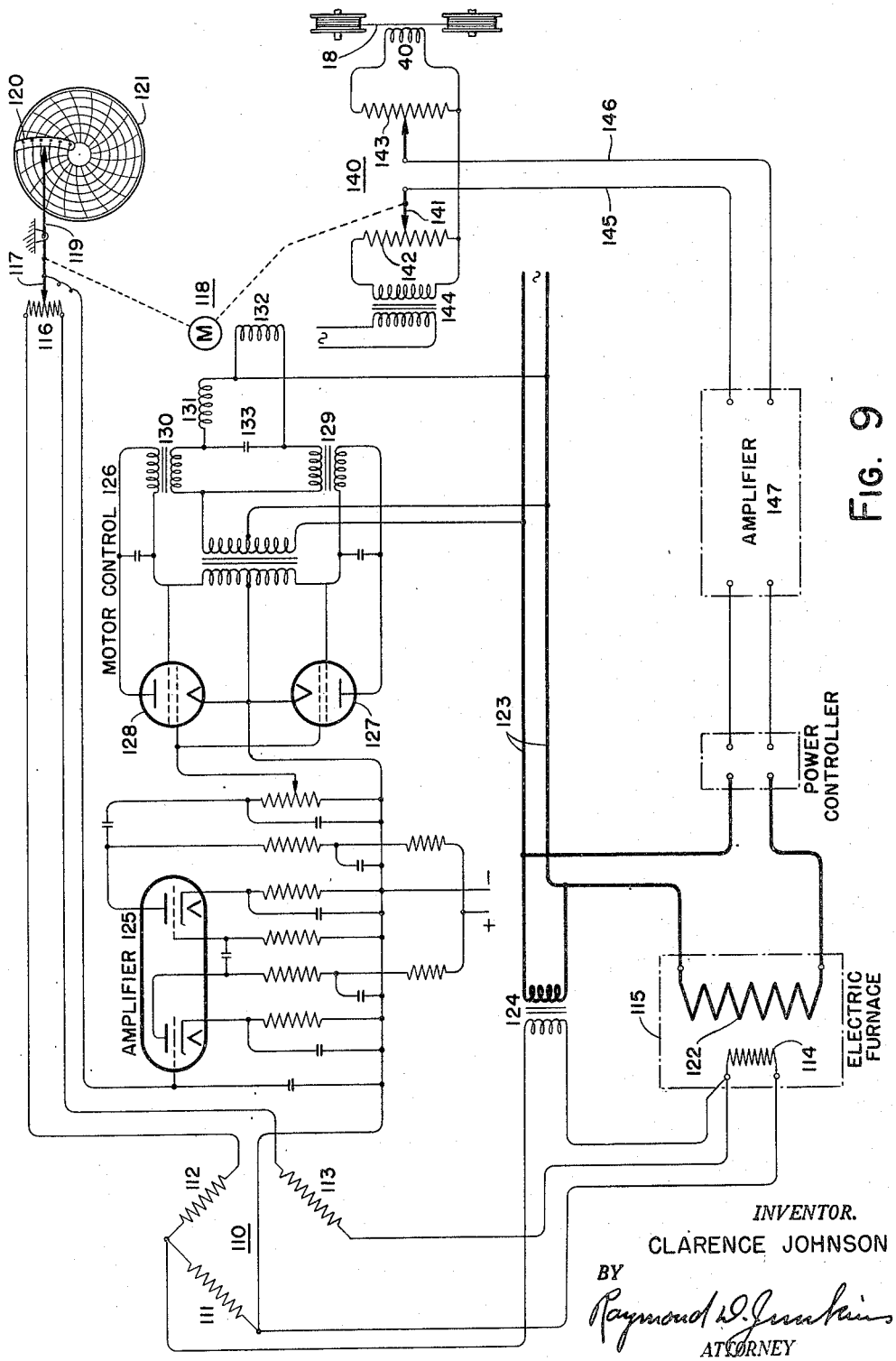

Fig. 9 diagrammatically illustrates a further embodiment of my invention in connection with furnace control.

Figure 10:
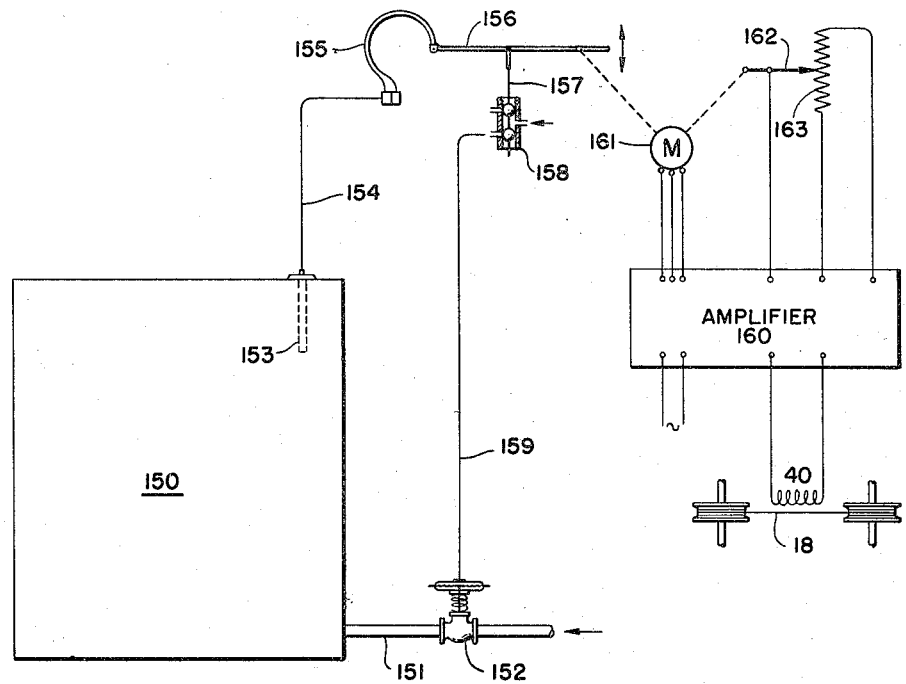

Fig. 10 diagrammatically illustrates an arrangement embodying my invention in another type of temperature control.

Figure 11:
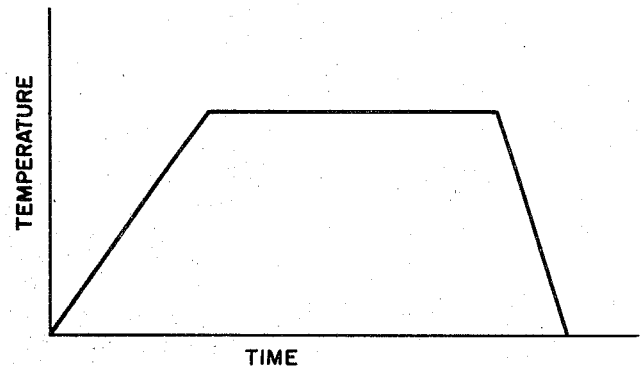

Fig. 11 is a graph in connection with Figs. 9 and 10.

As is well understood by those familiar with the art, in some machine tools, such as lathes, the tool is moved longitudinally and transversely of the work piece, which except for rotation about its center remains stationary. In other machine tools, such as some types of milling machines, the work piece may be moved in two directions, while the tool except for rotation about its axis remains stationary. In some other types of milling machines and in some die sinking machines the tool may be moved in one, two or three directions and the work piece may also be moved in one or more directions. In all instances, it will be observed, however, that it is the relative movement between the tool and work piece that causes the work piece to be formed to a desired shape. As one specific embodiment of my invention I have chosen to illustrate and describe my invention incorporated in a lathe, wherein the work piece, except for rotation about its center, remains stationary and the tool is moved transversely and longitudinally thereof. As another specific embodiment of my invention I have illustrated my invention applied to a milling machine wherein the tool, except for rotation about its center, remains stationary and the work piece is moved in two directions in order that the tool may cut the work piece to a desired shape. It will thus be evident that my invention is applicable to a wide variety of machine tools, and that when I speak of relative movement between the tool and work piece I include either an arrangement where the tool is stationary and the work piece moves, or the work piece is stationary and the tool is moved, or a combination of the two.

Figure 1:
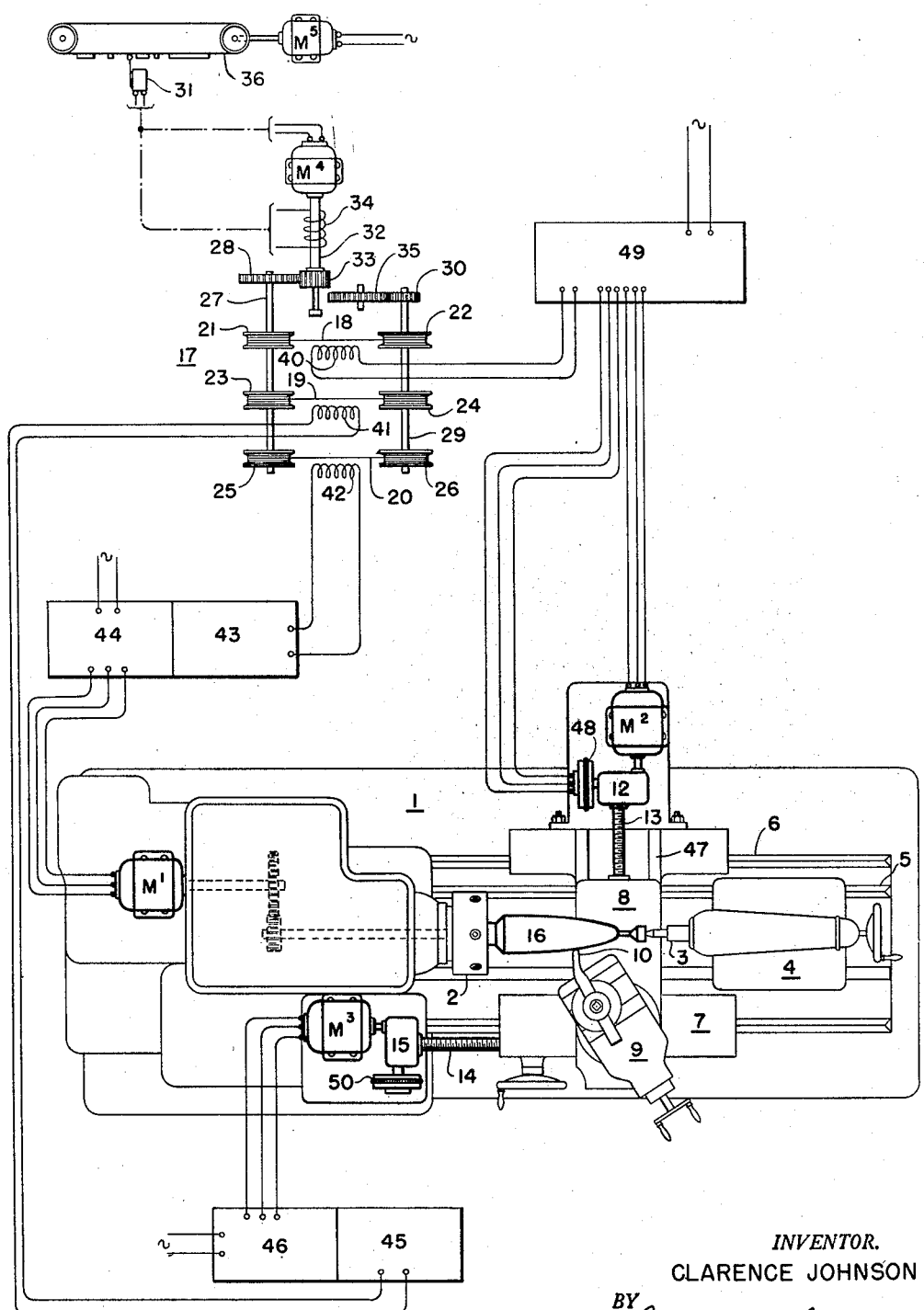
Fig. 1 is a diagrammatic showing of my invention embodied in the control of a lathe.

Referring now to Fig. 1, I show my invention applied to an engine lathe 1 having a head stock 2 adapted to be rotated at desired speed by a motor $M^1$, and having a tail stock 3. A carriage 4 is movable longitudinally along the bed of the lathe in suitable ways 5 and supports the tail stock 3. Also movable longitudinally along the bed of the lathe, in suitable ways 6, is a carriage 7. Mounted on the carriage 7 is a cross-slide 8, movable on ways transversely of the bed of the lathe.

The cross-slide 8 is provided with an adjustable tool support 9 in which is secured a tool 10. Transverse movements of the tool 10 are produced by means of an electric motor $M^2$ driving through the necessary gear reduction 12, a worm or screw 13 for positioning the cross-slide 8 transversely of the bed of the lathe. Longitudinal movements of the tool 10, that is movements of the tool parallel to the bed of the lathe, are produced by means of the lead screw 14, through the agency of motor $M^3$ and gear reduction 15.

Supported by the head stock 2 and tail stock 3 is a work piece 16 which for illustrative purposes is shown as being formed to a parabolic shape by the tool 10. The particular shape has no significance, it being apparent as the description proceeds that by my invention a work piece may be formed automatically to any desired contour. My invention lies primarily in the method of and apparatus for controlling the motors $M^1$, $M^2$ and $M^3$.

Prior systems for contour machining have used patterns, cams or templets, shaped to dictate the path of a tracer element controlling the cutting path of the tool along the work piece to form the latter to the desired contour. By my present invention I make use of the storing up of control signals by magnetically influencing magnetizable bodies and specifically by impressing a predetermined pattern of magnetism upon an elongated linear paramagnetic recording medium such as a wire or tape; thereafter utilizing the magnetic pattern to control power means for relatively moving the tool and work piece.

In connection with Fig. 1 I will describe my invention as utilizing a wire as the storing medium, although I may equally as well utilize a metallic tape or what is termed a magnetic paper tape which may be a paper tape coated with a magnetic substance capable of retaining a magnetic trace left by a recording head. In some arrangements, coated paper tape may be preferable over wire or metallic tape as it may be moved closer to the recording or reproducing transducers. Furthermore, there is no self-transducer effect and usually no level-wind mechanism in reeling is required.

The motors $M^1$, $M^2$ and $M^3$ are simultaneously, but separately, controlled by a wind-and-rewind system 17 having three elongated paramagnetic storing media in the form of wires 18, 19 and 20. The wire is preferably a steel wire of about .004" diameter and will of course be of considerable length.

In connection with wire 18 I show a pair of spaced reels 21, 22 interchangeably receiving the linear magnetic storing media 18. Similarly, reels 23, 24 and 25, 26 wind and rewind the wires 19 and 20. Reels 21, 23, 25 are carried by a shaft 27 having a driving gear 28. The reels 22, 24, 26 are carried by a shaft 29 having a driving gear 30.

For rotating the gears 28 and 30, and thus the shafts 27 and 29, I provide a motor $M^4$ having the necessary control 31 for starting or stopping the motor. The motor rotates in a single direction and may be provided with hand adjustable speed control for basically setting the speed at which it operates. The motor drives a shaft 32 and may have fixed or adjustable gear reduction to the end that shaft 32 rotates always in one direction at preselected speed, or is stopped.

Slideably mounted on the shaft 32 is a gear 33 shown in driving relation to the gear 28 so that when the motor $M^4$ is energized the shaft 27 is rotated and wires 18, 19 and 20 move from right to left (on the drawing) thus unwinding from reels 22, 24, 26 and winding on reels 21, 23, 25 respectively.

The shaft 32 is provided with a solenoid 34 (diagrammatically shown) so arranged that when energized it slides the gear 33 along a spline on the shaft 32 out of driving engagement with gear 28 and into engagement with a reversing gear 35 for driving the gear 30. Thus when the solenoid 34 is deenergized, the reels 21, 23, 25 are winding and the reels 22, 24, 26 are unwinding; but when the solenoid 34 is energized then the reels 22, 24, 26 are winding and the reels 21, 23, 25 are unwinding.

The control box 31 may also contain the necessary mechanism by which solenoid 34 is selectively energized or deenergized; and the selectivity may be accomplished according to a program belt, tape, or wire 36 driven at a constant speed by a motor $M^5$. I have very diagrammatically shown the belt 36 as having a number of protuberances thereon for actuating the control 31 but the belt 36 may have holes, slots, or other arrangements for accomplishing the sequential or program actuation of the solenoid 34 as well as the stopping or starting of motor $M^4$ to the end that the direction and time of operation as well as the stopping and starting of reels 21, 23, 25, 22, 24, 26 may be desirably accomplished in preselected manner.

Adjacent the wires 18, 19, 20 I locate the pick-up devices 40, 41, 42 respectively; shown diagrammatically as windings subject to the magnetic field emanating from the wires as the latter are moved at predetermined speed past the pick-up devices. Preferably the winding is on a core presenting a pair of pole pieces past which the record wire is moved; the flux emanating from the magnetized record wire being used to pass a varying flux through the pole pieces and thereby induce a potential in the winding.

The potential or current induced in winding 40, 41 or 42 is used in the control of motors $M^2$, $M^3$ and $M^1$ respectively and may, in my invention, be used in somewhat different manner in the control of the difference motors.

The magnetic shaping of the elongated medium (wire 18, 19 or 20) is not necessarily the same for the three wires but is so proportioned and coordinated that the three programs or magnetic cams cooperate to produce a resulting operation of motors $M^1$, $M^2$ and $M^3$ whereby the relative movement of the tool 10 and work piece 16 produces the desired configuration of the work piece. No one of the three wires individually has a magnetic shape or pattern corresponding directly or proportionately to the desired contour of the work piece, but the magnetic patterns of the three wires, controlling the three motors simultaneously, results in a cooperative effort producing the final desired work piece contour. I will later explain, however, how I may combine the control of any two or all three of the motors from a single wire or tape.

Considering first the motor $M^1$ and its control it will be noted that it is adapted to rotate the work piece 16 in a single direction and usually at a uniform speed, although I provide that the speed of rotation may be changed in accordance with a predetermined program determined by the desired shape of the work piece. The potential induced in the pick-up winding 42, through movement of wire 20, is effective in control of motor $M^1$ through the agency of amplifier 43 and motor control 44.

In this description I will refer to the pattern or cam of magnetism stored by the elongated paramagnetic medium as an envelope having a contour determined by the magnitude of magnetization of successive increments of the medium moved past a point of the pick-up. Thus the potential induced in the winding 42, as the wire 20 is moved along, will vary in magnitude in accordance with the shape of the magnetic envelope of the wire 20. If the bounds of the envelope are parallel to the wire axis the speed of motor $M^1$ will be uniform and of a magnitude determined by the spread of the envelope. The adjustment of networks 32, 44 may be such as to have a predetermined finite value of envelope with the motor not rotating, in which event a decrease in envelope width will result in reversal of motor rotation.

Figure 2:
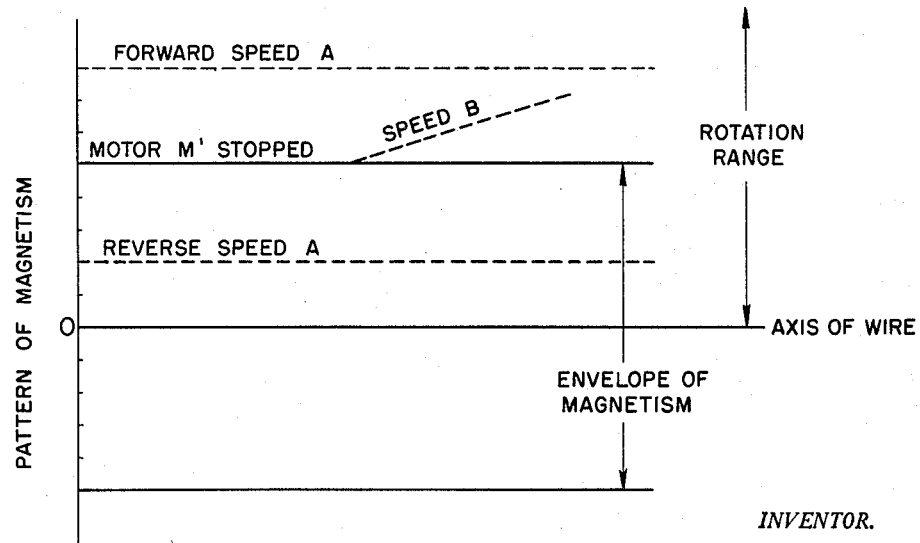
Fig. 2 is a graph of motor operation in connection with Fig. 1.

This operation may be schematically depicted as in Fig. 2 which indicates the axis of the wire as the line of zero magnetism. In this representation the envelope is considered as surrounding the wire with its bounds equal distance from the wire axis. With rotation desired only in forward direction, then the adjustment of network 43, 44 may be such that the motor is stopped when the envelope is zero; any finite value of envelope resulting in a corresponding forward speed. On the other hand, Fig. 2 depicts the motor $M^1$ stopped with envelope value of five units. A constant forward speed A is depicted at envelope value eight and a similar reverse speed A at envelope value two. Any desired pattern of speed such as a gradual increase B may be attained by the proper shaping of the magnetic envelope.

The motor $M^3$ is arranged to rotate the lead screw 14, through gear reduction 15, for traveling the carriage 7 longitudinally along the bed of the lathe. Pick-up 41 is sensitive to the magnetic pattern of wire 19 and, through control network 45, 46, controls the starting of motor $M^3$ and its operating speed, and thus the travel of the tool 10 parallel to the axis of the work piece 16. The operation may be similar to that depicted in Fig. 2 in connection with motor $M^1$.

Motor $M^2$ and its gear reduction 12 are mounted on an extension of carriage 7 and thus travel longitudinally of the lathe with tool 10. Transverse movements of the tool, i. e. movements of the tool toward or away from the work piece 16 are accomplished by the screw 13, driven by the motor $M^2$ and gear reduction 12, which moves the cross-slide 8 along suitable ways 47. A balancing slide-wire 48 is driven by the gear reduction 12 to the end that its value is in step with the transverse position of tool 10.

The envelope pattern of wire 18 more closely approaches the desired shape of the work piece 16 than the pattern of wires 19 and 20. The pickup wire 40 is connected to a bridge network and motor control 49 which joins the motor $M^2$ and balancing slide-wire resistance 48. As the envelope of wire 18 changes, the network 49 is unbalanced, resulting in a starting of motor $M^2$ in proper direction to move the tool toward or away from the axis of work piece 16, and at the same time move the slidewire 48 to follow up or tend to maintain the network in balance. The motor $M^2$ is not normally continuously running, as are motors $M^1$ and $M^3$ but stops, starts and reverses, at variable speeds, under the dictates of the wire 18 pattern.

In general the three motors $M^1$, $M^2$ and $M^3$ coact under the control of pick-ups 40, 41 and 42 to give a coordinated control of relative movements of the tool and work piece whereby the work piece is shaped to desired form. I have not felt it necessary to explain how the magnetic envelope of the wires 18, 19 and 20 are calculated and impressed upon the wires inasmuch as known methods and transducing apparatus may be employed. It is only necessary to point out that the envelope pattern of the three wires are so arranged that when the wires are driven in synchronism the resultant movements of the three motors controlled thereby will cause a relative positioning of the tool and work piece to the end that the work piece is formed to desired shape.

By way of a practical example, in connection with Fig. 1, I may indicate that the motor $M^1$ rotates the work piece in proper direction at uniform speed and that the motor $M^3$ rotates the lead screw 14 in proper direction to travel the carriage 7 from right to left (in the drawing) at desired speed. If the motor $M^2$ is stopped then the forward travel of the tool 10 will turn the work piece 16 to cylindrical form. The diameter of the cylinder will of course depend upon the transverse location of the cutting tool 10 at the time motor $M^2$ is stopped. If a greater or smaller diameter of cylinder 16 is desired, then the motor $M^2$ will be energized in proper direction to move the tool 10 toward or away from the axis of the work piece to the desired diameter of the finished product.

Referring to Fig. 2 it will be understood that an energization of motor $M^2$ occurs only upon a change in size of the envelope of wire 18 thus so long as the envelope remains of constant size the path of the tool 10 will be parallel to the axis of the work piece 16. Upon any change in the diameter of the magnetic envelope of wire 18 the network 49 becomes unbalanced thus actuating motor $M^2$ to move the tool 10 toward or away from the axis of the work piece 16 and at the same time move the slide-wire 48 to follow up and tend to balance the network. As soon as the envelope is no longer changing the network balances and rotation of motor $M^2$ ceases. Thus it will be seen that if the contour of the envelope is a gradual taper then the resultant cutting of the work piece 16 will be tapered and to a degree determined by the rate of change in the envelope pattern. This of course is premised upon a uniform speed of motor $M^3$ so that the tool 10 travels at a constant speed from right to left.

Should it be desired to machine the work piece 16 with a sharp shoulder normal to the axis of the work piece, then when that point on the envelope pattern is reached motor $M^3$ is stopped thus stopping longitudinal travel of tool 10, and at the same time motor $M^2$ is energized in proper direction to move the tool 10 toward or away from the axis of the work piece 16 to produce the desired shoulder. It will thus be seen that any normal machined contour may be produced on the work piece by a proper combining of the three envelope patterns.

Normally the longitudinal travel of the tool 10 is from right to left facing the drawing of Fig. 1 and at what may be termed a normal speed. If the transverse motor $M^2$ rotates in either direction, thus positioning the tool 10 either toward or away from the axis of the work piece 16, then the speed of rotation of the motor $M^3$ and consequently the speed of longitudinal travel of the tool 10 is decreased. This proceeds to a limit wherein if the transverse movement of the tool 10 is directly toward or way from the axis of the work piece 16 (as dictated by the envelope patterns) then under this condition the motor $M^3$ would not rotate and the tool would not travel longitudinally relative to the work piece until the direct transverse motion of the tool had been accomplished. In this way direct 90 degree shoulders are produced on the work piece 16.

For certain operations it may be desirable to provide a 3-element control of the lathe, namely to include with the control of transverse and longitudinal movement of the tool 10 a control of speed of rotation of the work piece relative to the tool. This is so that the cutting speed of the tool may be held constant, i. e. the speed of rotation of the work when cutting at one diameter to be proportionally greater or lesser than the speed of rotation when cutting at a different diameter. To accomplish such control I provide for rotating the work piece 16 through the necessary gears by the motor $M^1$ and controlled as previously. In other words the motor would rotate normally in a single direction but its speed of rotation would depend upon the transverse position of the tool 10 and consequently upon the diameter of the work piece at which the tool were cutting.

As I have previously mentioned the control 31, in conjunction with the programmed belt 36, may be arranged for complete sequential or program operation of the lathe to the end that after the work piece 16 is properly in place one or a series of cutting operations may be performed thereupon by the tool cam with automatic return of the tool to its starting position at the end of each cutting pass. For example the arrangement may be such that the wires 18, 19 and 20 are moved to provide the proper guidance for the tool 10 in a cutting travel from right to left within predetermined limits of travel. Upon reaching a predetermined limit of travel to the left of the drawing the program arrangement may retract the tool 10 away from the surface of the work piece 16, stop (or continue) rotation of the work piece 16, back travel the tool 10 to its starting position at the right at high speed, and move it forward into cutting engagement with the work for a second cutting pass over the work; all under the dictates of the magnetic patterns on wires 18, 19 and 20 as well as the programmed belt 36 and control 31.

Figure 3:
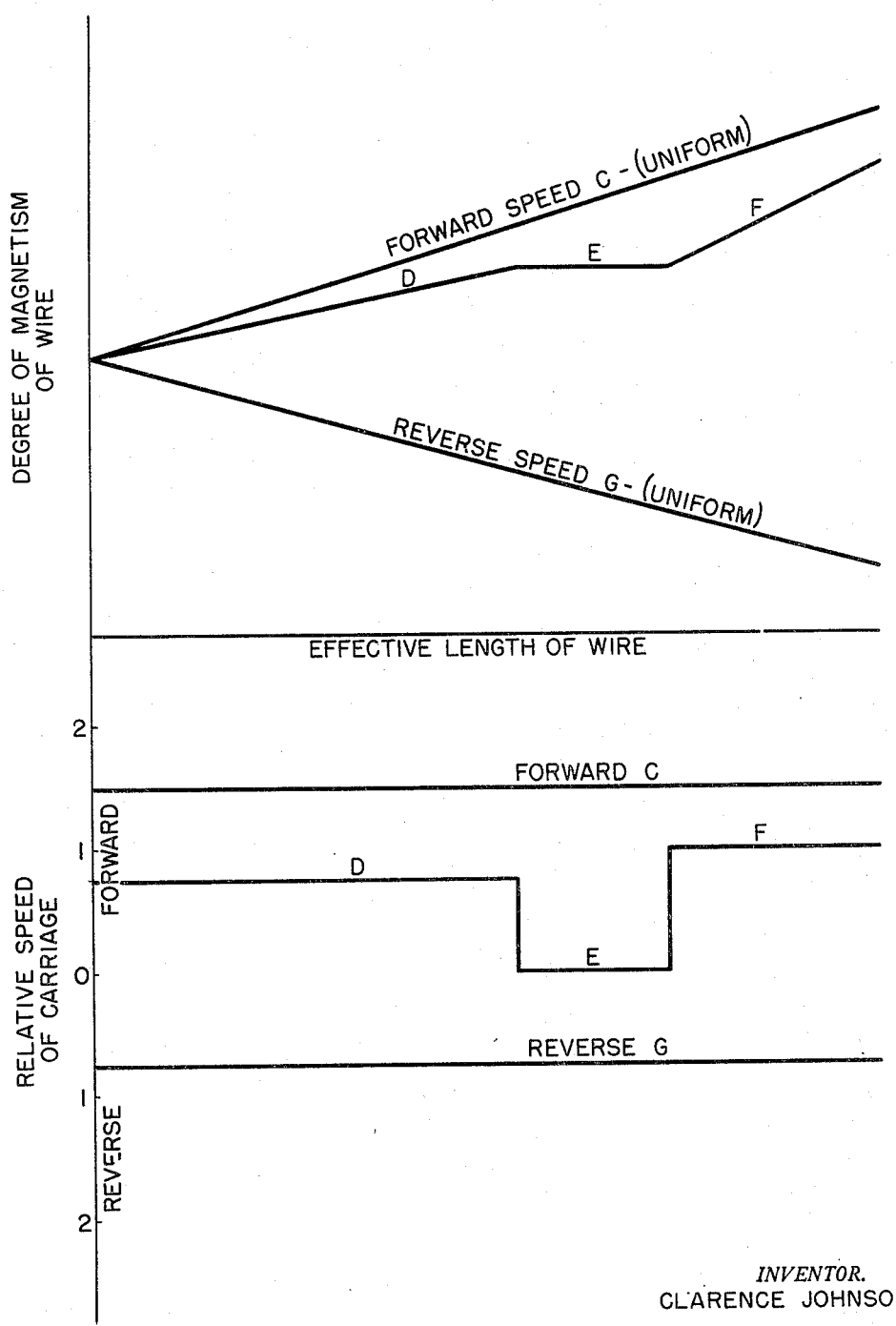
Fig. 3 is a graph of a different motor control arrangement.

In connection with Fig. 2 I have explained one possible operation for such an operating motor as motor $M^1$. Reference now to Fig. 3 will show a possible motor control, in connection with stored magnetic pattern, where changes in the motor operation are accomplished in accordance with change or rate of change in magnitude of the envelope rather than directly in accordance with the envelope magnitude.

The graph of Fig. 3 might well represent control of motor $M^3$ for longitudinal travel of the tool 10. I have plotted this figure greatly out of scale as particularly in connection with the effective length of the wire versus degree of magnetism of the wire. With this arrangement, based on rate of change of the dimension of the magnetic envelope it will be seen that uniform forward speed C will be obtained for a predetermined gradual and uniform increase in degree of magnetism along the wire. The upper curve shows the uniform slope of this relationship whereas the lower curve C shows a uniform forward speed corresponding to the particular slope of the magnetism of the wire. At a different lesser slope D, in the upper curve, a lower uniform speed D of motor $M^3$ will be obtained, while if the envelope has a space of uniform dimension as designated E where there is no increase or decrease in the bounds of the envelope then motor $M^3$ is stopped as is the longitudinal travel of carriage 7. Referring to the upper portion of the figure if, after a portion E, the envelope increases at a somewhat faster rate than over the portion D this will dictate a new forward uniform speed F in the lower graph. Furthermore, a decreasing taper G will result in a uniform reverse speed of a value depending upon the slope of the magnetic envelope taper.

It will be evident that the arrangement so far described is for substantially uniform longitudinal movement of the tool 10 with contouring movement transversely. If it is desired to do the reverse operation such as facing a large disc-like work piece in contoured pattern, i. e. where the transverse positioning of the tool 10 is substantially at a uniform speed and the longitudinal positioning of the tool 10 is in accordance with a contouring pattern then this may readily be accomplished through the necessary switching mechanism whereby the slidewire 48 is made ineffective for the motor $M^2$ and a slidewire 50 is brought into play for the motor $M^3$.

Figure 4:
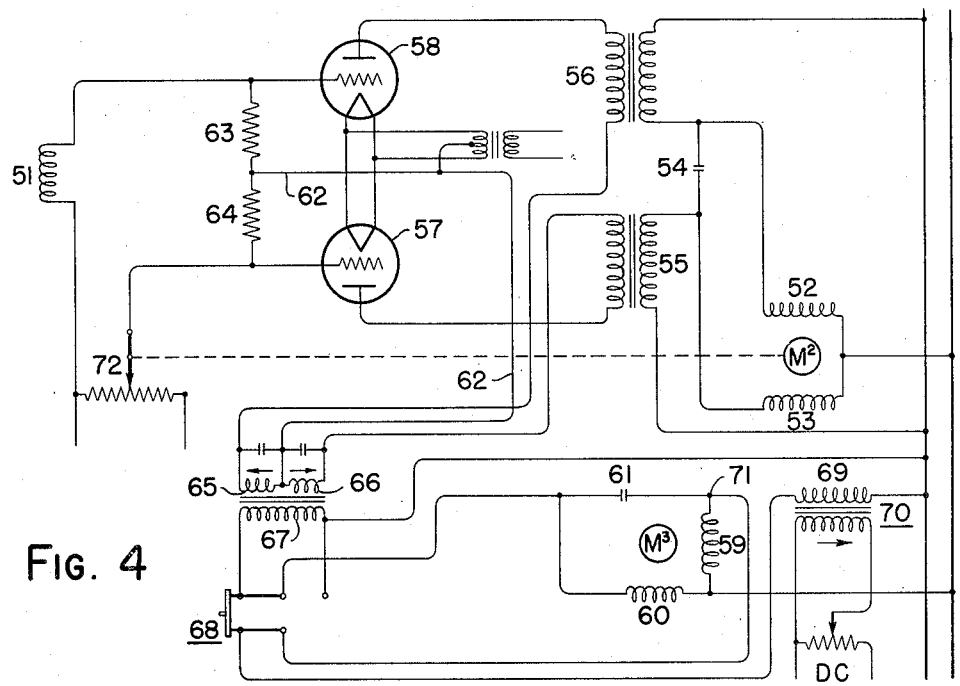
Fig. 4 is an electric circuit diagram for a two-element control.

In Fig. 4 I show a wiring diagram of what I term a 2-element control wherein the motors $M^2$ and $M^3$ are under the control of a single pick-up device 51 which is located adjacent a moving wire having an envelope pattern so proportioned as to produce the desired configuration of the work piece 16 by the two motors $M^2$ and $M^3$ simultaneously controlled from the one envelope pattern.

The motor $M^2$, for positioning the screw 13, has stator windings 52, 53 constituting running coils electrically 90 degrees apart. The motor is provided with a capacitor or condenser 54 which, when the motor is rotating, is in series with either the winding 52 or the winding 53 depending upon desired direction of rotation. Such a motor runs as a 2-phase A.-C. motor and not only may be reversed as to direction of rotation but is susceptible of speed control when rotating in either direction. When the output of the transformers 55, 56 is equal the rotor does not rotate, but with an unbalance in output of the transformers 55, 56 the rotor rotates in predetermined direction and at a speed depending upon the extent of the unbalance of output of the transformers. The output of tubes 57, 58 is controlled by a circuit including the grids respectively of said tubes as well as including the pick-up device 51. If there is no induced potential through the pick-up device 51, i. e. no value of magnetic envelope of the pattern the tube 58 passes current and the tube 57 does not. When a maximum potential occurs at the device 51, then the tube 57 passes current, but the tube 58 does not. At all intermediate values of potential at the device 51 the two tubes 57, 58 pass proportionate amounts of current and proportionally or differentially vary the impedance of the secondaries of transformers 55, 56, resulting in a corresponding variation in energization of the field windings 52, 53, and if the energization of the windings is unbalanced, then rotation of the rotor is in predetermined direction and at a predetermined speed, dependent upon the amount of unbalance.

For positioning the cross slide 8, as well as the tool 10, in a longitudinal direction parallel to the axis of the work piece 16 I provide the electric motor $M^3$ illustrated in Fig. 4 as a capacitor-run alternating current motor having two windings 59, 60 electrically 90 degrees apart and a capacitor 61. When current flow is directly through one of the windings 59 or 60 and simultaneously through the other winding in series with the capacitor 61 the motor rotates in desired direction.

The arrangement is such that normally the motor $M^3$ rotates in but a single direction but at a variable or controllable speed. Normally, the longitudinal travel of the tool 10 is from right to left facing the drawing of Fig. 1 and at what may be termed a normal speed. If the transverse motor $M^2$ rotates in either direction, thus positioning the tool 10 either toward or away from the axis of the work piece 16, then the speed of rotation of the motor $M^3$, and consequently the speed of longitudinal travel of the tool 10, is decreased. This proceeds to a limit wherein if the transverse movement of the tool 10 is directly toward or away from the axis of the work piece 16 (as dictated by the pattern envelope to which the pick-up device 51 is sensitive) then under this condition the motor $M^3$ would not rotate and the tool would not travel longitudinally relative to the work piece until the direct transverse motion of the tool had been accomplished. In this way direct 90 degree shoulders are produced on the work piece 16.

I show in Fig. 4 an electric circuit for control of the motor $M^3$ such that it normally rotates in but a single direction and what may be termed a normal speed when the motor $M^2$ is not rotating; in other words, when the output of the transformers 55, 56 is balanced. If the motor $M^2$ begins to rotate in one or the other of its two directions then the speed of rotation of the motor $M^3$ is decreased. When the motor $M^2$ is rotating at its maximum speed in either direction then the motor $M^3$ is stopped.

A conductor 62 joins the common terminal of resistances 63, 64 with the common terminal of the transformer secondaries 55, 56 but interposed between the said secondaries are direct current saturating windings 65, 66 whose common terminal is joined to the conductor 62. These saturating windings 65, 66 are bridged by condensers and are so arranged as to be oppositely effective in saturating the core of a saturable core reactor having an A.-C. output winding 67.

I illustrate a double pole double throw switch 68 which under normal operating conditions is in the position illustrated. One pole of said switch joins the alternating current output winding 69 of a saturable core reactor 70 with the terminal 71 of the motor $M^3$.

If the envelope of the pattern dictates a cylindrical turning of the work piece 16 then the potential value of the pick-up device 51 is normal, the tubes 57, 58 pass equal amounts of current, the impedance of the transformers 55, 56 is equal, and the motor $M^2$ is stationary. Under such condition it is desired that the motor $M^3$ be operating in its normal direction at its normal speed. Saturating effects of the windings 65, 66 is equal and in opposite direction, thus permitting a minimum flow of alternating current through the output winding 67 and the motor $M^3$ in opposition to the constant bias effect of the reactor 70.

While in Fig. 1 I show the slide-wire 48 as a tie-back means to stop motion of the motor $M^2$ when transverse movement of the tool 10 has satisfied the demand of the envelope pattern and to result in cylindrical turning for any instant or period of time, in Fig. 4 I show a tie-back means comprising an adjustable resistance 72 whose movable part is positioned by the motor $M^2$ in comprising a balancing effect to overcome or offset the potential induced in the pick-up device 51. Thus, movement of the motor $M^2$ results only when there is an unbalance between 51 and 72 and any motion of motor $M^2$ serves to readjust element 72 to bring about a rebalancing and stopping of the motor $M^2$.

Upon change in the potential of pick-up 51 in either direction from a previous position value the current flow through the transformer secondaries 55, 56 is unbalanced thus unbalancing the D.-C. saturating effect of the windings 65, 66. It is immaterial as to whether 65 or 66 predominates, as regardless of the direction of predominance it is the difference between the two which provides an increase in saturating effect upon the reactor and an increase in passage of alternating current through the output winding 67 in opposition to the constant value of alternating current passing through the output winding 69 of the bias reactor 70. As the transformers 55, 56 continue to a maximum of unbalance, corresponding to maximum speed of the motor $M^2$ in one direction or the other, the alternating current flow through the winding 67 opposes that through the winding 69 until they reach a value of equality whereupon the motor $M^3$ ceases to rotate. In order that there may be no possibility of the motor $M^3$ reversing its direction of rotation the value of the bias current through 69 is slightly greater than that ever attained through the winding 67. Theoretically the motor $M^3$ will not cease rotating, but practically its speed of rotation diminishes to a point where friction and load actually stop rotation.

It will thus be clear that the motor $M^3$ normally rotates in but a single direction and at a speed from normal varied downward to zero, dependent upon the increase in speed of rotation of the motor $M^2$ and independent of the direction of rotation of the motor $M^2$.

In order that a rapid return of the tool 10 from left to right may be accomplished at maximum rotating speed of the longitudinal travel lead screw 14 in proper direction the switch 68 when thrown in position opposite to that shown in Fig. 4 properly connects the windings 59, 60 directly across the power source so that the direction of rotation of the motor $M^3$ is reversed.

Figure 5:
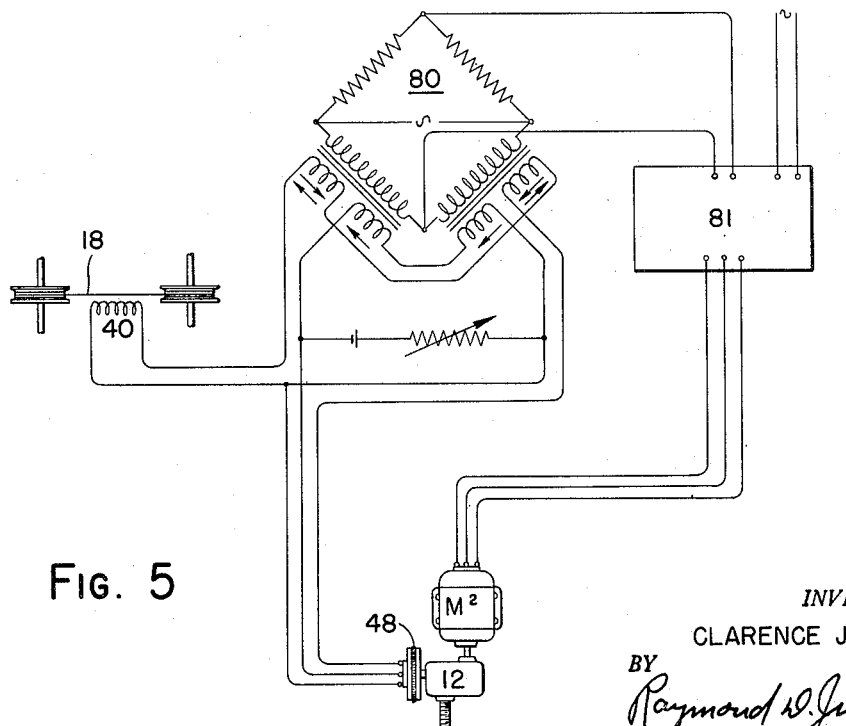
Fig. 5 is an electric circuit diagram for a d-c pick-up.

In Fig. 5 I show an electric network such as may be used in the control of motor $M^2$ if the pickup device 40 has induced therein a low value D.-C. potential. The reactor-converter circuit 80 may be of the type disclosed in Patent 2,447,338 to Hornfeck. The output of the bridge 80 supplies the amplifier and motor control circuit 81 for the motor $M^2$ while the slidewire 48 provides the necessary tie-back to the bridge 80. The result is that a low level D.-C. input is converted into a greatly amplified A.-C. output useful in operating the reversing motor $M^2$.

Throughout this disclosure I indicate the work piece is formed to correspond to the shape of the magnetic pattern or envelope. By such language I do not intend to imply that the work piece is brought to the exact shape of the pattern but as will be evident to those familiar with the art the pattern will be formed so that the ultimate shape of the work piece produced is that desired and that therefore the shape of the work piece may differ from that of the pattern by the amount of angularity, etc. in the mechanism. While the pattern or patterns must "correspond" to the desired workpiece, they are not necessarily identical in contour and therefore the term "correspond" implies that the magnetic pattern or envelope is purposely designed to result in a desired contour of the work piece to be produced. In speaking of profile or contour I mean the forming of a work piece to a shape as dictated by that of the pattern and without any specific or limiting meaning being given to the terms "profile" and "contour."

Figure 6:
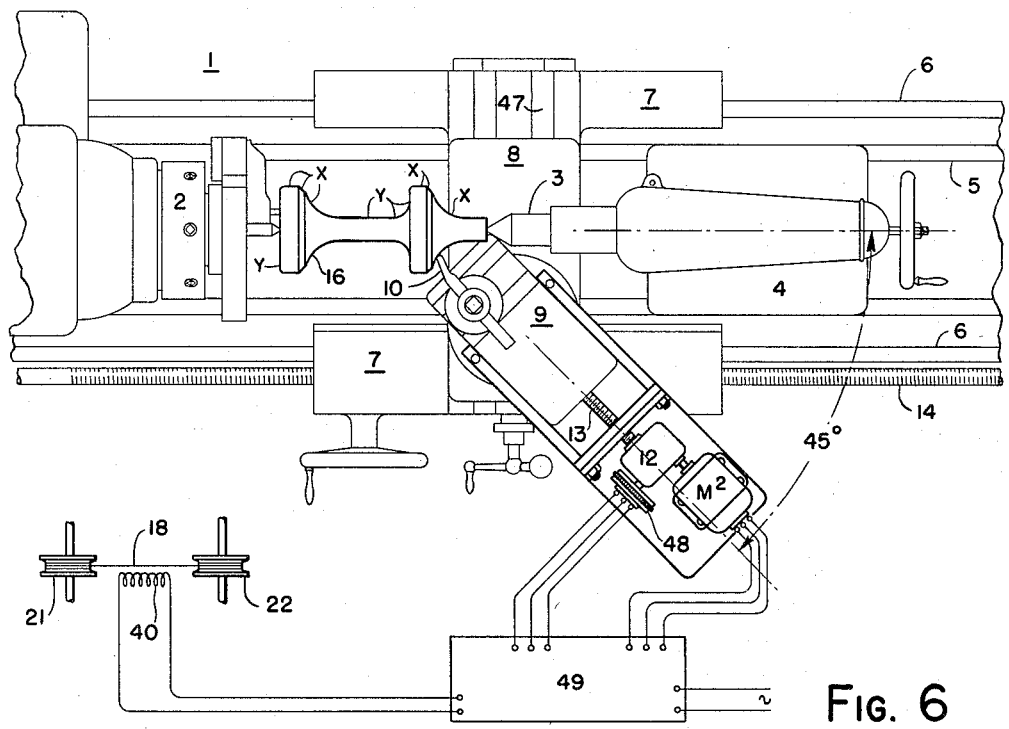
Fig. 6 is a plan view of a portion of a lathe under single-element control.

Referring now to Fig. 6 I show therein an adaptation of my invention to a single element contouring arrangement for a lathe arranged, in certain instances, to perform the operation previously described as accomplished by the two separate motors $M^2$ and $M^3$. The lathe parts as shown in Fig. 6 bear the same numerals as those of Fig. 1, where identical. Mounted on and carried by the cross-slide 8 is an angularly positionable compound rest 9 forming a support for the tool 10. Movements of the tool 10 longitudinally relative to the work piece 16 are produced through the agency of the normal lead screw 14 and through the agency of the motor $M^2$ which is arranged to position the compound rest 9 through the agency of the screw 13. The motor $M^2$, gear reduction 12, slidewire 48, and screw 13 are supported by and carried by the compound 9, angularly positionable therewith, positionable by and with the cross-slide 8 transversely of the axis of the lathe, and carried by the carriage 7 longitudinally of the lathe when the carriage 7 is so positioned through the agency of the lead screw 14 or otherwise.

A study of Fig. 6 will show that the top slide of the compound 9 (which carries the tool 10) is positionable relative to that portion of the compound 9 fixed to the cross-slide 8, through the agency of the screw 13. If the angularly positionable upper portion of the compound 9 is so turned that the axis of the screw 13 is normal to the axis of the lathe and work piece, then transverse movement of the cross-slide 8 will result in transverse positioning of the tool 10 normal to the axis of the work piece. If, however, the angularly positionable upper portion of the compound 9 is so moved that its center line (as in Fig. 6) is at an angle of 45 degrees with the axis of the work piece, then (with no longitudinal movement of the carriage 7) the tool may be moved toward or away from the work piece 16 through the agency of the screw 13 at an angle of 45 degrees to the axis of the work piece.

It is apparent that other angular relationships may under certain conditions be more advantageous. The exact angular relationship depends upon various things, such as the desired shape and finish of the work piece, the speed of the lead screw 14, and the speed of travel of the screw 13. The speed of the screw 13 is preferably several times faster than the speed of travel of the carriage 7 by the lead screw 14. If the travel of screw 13 is fast enough relative to the carriage, then the cutting of the work is dependent only on the pattern.

In the example illustrated in Fig. 6 I preferably travel the carriage 7 from right to left at a uniform speed through the agency of the regular lead screw 14. The tool is moved toward or away from the axis of the work piece by the motor driven screw 13. The resultant positioning of the tool 10 relative to the work piece is a vector resultant of the two motions. By proper choice of the speed of such movements the work piece 16 may be turned to a taper or to have straight shoulders normal to the axis of the work piece. I will now describe the conditions under which three general types of cuts may be taken, and it will be appreciated that intermediate types of turning may be accomplished by modifications of adjustments to be mentioned.

A. *Cylindrical turning.*—Assume uniform preselected speed of rotation of the work piece 16 and uniform preselected speed of travel of the carriage 7 along the ways 6 from right to left. The tool 10 is moved toward the axis of the work piece until it cuts to the required diameter. Thereafter the screw 13 is not moved and cylindrical turning of the work piece is accomplished.

B. *Taper turning.*—Assume again the uniform preselected speed of rotation of the work piece 16 and the uniform preselected speed of travel of the carriage 7 along the ways 6 from right to left. Assume that the desired taper of the work piece is to start with a minimum diameter at the right and gradually taper to a maximum diameter at the left. The screw 13 is used to advance the tool 10 until it cuts the desired minimum diameter of the taper. Thereafter, as the tool is carried by the carriage 7 from right to left, the screw 13 is uniformly retracted, resulting in the work piece being formed to a taper whose slope is determined by the envelope pattern, the speed of longitudinal travel of the carriage 7, and the speed of retraction of the tool by means of the screw 13.

C. *Shoulder turning.*—Utilizing a standard or commercial lathe I again assume a uniform preselected speed of rotation of the work piece 16 and the uniform preselected speed of travel in the carriage 7 along the ways 6 from right to left. If the turning of the work piece at a given diameter point requires an immediate change in diameter, the desired result is a straight shoulder or step on the work piece with the face of the shoulder lying in a plane normal to the axis of the work piece. If the screw 13 is retracted uniformly at the correct speed the result or vector cutting travel of the tool 10 follows a path which is the resultant of two interrelated movements, namely, uniform movement from right to left axially relative to the work through the agency of the lead screw 14, and a retraction along a line 45 degrees from the axis of the work through the agency of the screw 13. Proper choice in speed of retraction of the screw 13 (relative to the speed of travel of the carriage 7) produces a movement of the tool 10 in a direction normal to the axis of the work piece and a sharp step or shoulder is cut upon the work piece. A modification in relation between the speed of movement of the carriage 7 and the speed of retraction by the screw 13 results in taper turning as previously mentioned. Such a modification is, of course, obtained in the rotational amount and direction of screw 13 by the cooperation of the pick-up 40 with the magnetized wire 18.

Figure 7:
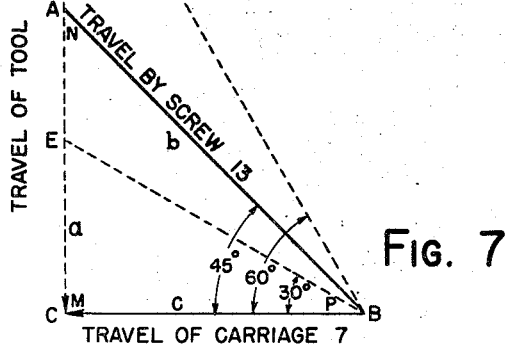
Fig. 7 is a graph in connection with Fig. 6.

I have found that a relationship of 45 degrees is the most universally applicable relative position of the parts. This, of course, is because 45 degrees is mid-way of the 90 degree angular relation desired between the axis of the work piece and the face of a shoulder. Refer now to Fig. 7. The possible speed of tool travel by means of screw 13 from A to B is several times the lead screw speed of the carriage 7 from B to C although the actual speed of retraction by screw 13 from A to B is dictated by the envelope pattern. If the angle ABC is 45 degrees then the resultant travel of the tool will be AC and inasmuch as $AC = CB$ the cutting speed of the tool in machining the shoulder will be the same, and the finish will be the same, as if the tool were cutting cylindrically along a path BC.

If the angle is changed to 60 degrees, for example as DBC, then the finish along DC will be nearly twice as coarse as it would have been along a path BC. This is sometimes desired in step shafts. If the angle is reduced to 30 degrees as EBC then the finish on the shoulder will be finer than it would have been along the path BC.

The mathematical analysis of the unit is based upon the sine law.

$$\frac{a}{\sin p} = \frac{c}{\sin n}$$

sin $p$, sin $n$ and $c$ are known $$a = \frac{c (\sin p)}{\sin n}$$

The finish is inversely proportional to the feed per revolution, therefore if the feed along $c$ is $cf$ and the resultant feed along $a$ is $af$ $$af = \frac{cf (\sin p)}{\sin n}$$

at 45° $p$ and $n$ are the same and $$af = cf$$

at 60°

$$af = cf \frac{.866}{.500} = 1.7 \, cf$$

at 30°

$$af = cf \frac{.500}{.866} = .57 \, cf$$

It will now be apparent that I have been able, through the agency of my present invention, to accomplish shoulder cutting, as for example in step shaft turning, with a single motion attachment. In the preceding description, with the carriage 7 traveled from right to left, I am able to produce shoulders or steps going from a smaller to a larger diameter. It is not practical with the same setup and operation to produce steps going from a larger to a smaller diameter. To produce such shoulders it would be necessary to angularly move the compound 9 clockwise approximately 90 degrees and then travel the carriage from left to right. A practical solution is, if the step shaft is to have shoulders of both types, to first cut all of the shoulders in one direction and then to reverse the work and produce the remaining shoulders. This obviously would be accomplished in batches, i. e. a small run of shafts might be put through the machine to produce the turning in steps in one direction and then the complete batch to be run through after necessary changes in pattern, tool or the like has been made.

In so stating a limitation of my present invention one must not lose sight of the fact that to a certain extent the same limitation exists with a dual motion arrangement, for normally the cutting angle of the tool, as well as its form and shape, will not permit the turning of approaching and receding shoulders with a single setup and continued travel of the tool in one direction axially relative to the work. It is not practical in production to grind a tool with a proper rake and relief for cutting around 180 degrees of the tool.

The particular work piece 16 illustrated in Fig. 6 is a double disc valve part. This is an ideal production piece for the apparatus being described inasmuch as the surfaces X are to be machined to a predetermined shape whereas the surfaces Y may be left unmachined. The work piece 16 is usually a casting or forging and the original relatively rough unmachined surfaces Y are not the working surfaces, and therefore do not need to be machined. Obviously the desired contour of the surfaces X is incorporated in the envelope pattern of the wire 18.

The description so far has been concerned with external turning of work pieces. If internal contour boring is desired it is only necessary to replace the tool 10 by the proper boring bar and operate upon the far side of the cavity in exactly the same manner as described for external turning. Face plate turning may be accomplished in exactly the same manner and with the same limitations as described in connection with external turning. In connection with Fig. 8 I will later describe an improved method of overcoming some of the limitations previously mentioned in connection with the lathe and these as described for a vertical boring mill are equally applicable in face plate turning as will be readily apparent.

A further specific use for my invention is in connection with the winding of springs where the pitch and lead may vary from one batch to another and with different sizes of material and of spring or the pitch and lead may vary desirably in a single spring. I preferably provide a rotating core or mandrel on which the spring is to be wound. A tool 10 is replaced by a wire guide through which the wire is passed or pulled by the winding operation on the mandrel. It is essential that the guides move along the mandrel at a speed determined by the desired pitch of the spring.

Referring to Fig. 6 preferably the compound 9 would be placed at approximately 60 degrees to the axis of the mandrel so that the retraction of the holder, through the agency of screw 13, would bear the proper relation to the lead screw travel of the carriage 7. The envelope pattern of the wire 18 may have a gradual inclination or slope relative to the axis of the work piece in a direction such that a continual uniform retraction of the tool through the agency of the screw 13 would be accomplished. Proper shaping of the envelope pattern would result in a vector movement of the wire guide axially of the mandrel at a speed slightly less than that produced by the lead screw 14 alone. With the arrangement as described the gear ratio for the lead screw 14 would always be pitched slightly greater than the desired pitch of the spring and thus a uniform retraction of the tool by the screw 13 would slow down the carriage travel rates to the desired rate.

Figure 8:
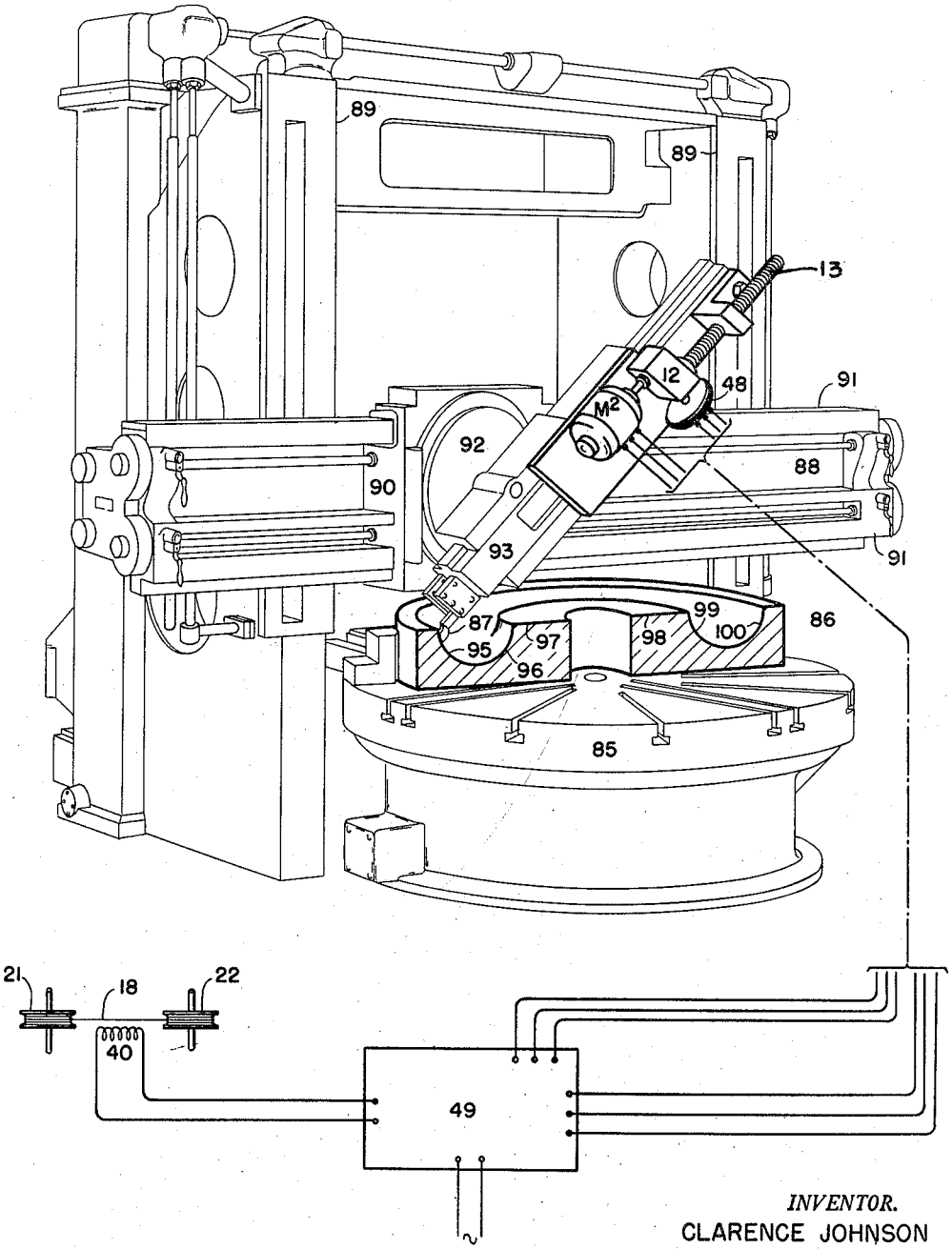
Fig. 8 illustrates my invention applied to a vertical boring mill.

Referring now to Fig. 8 I show therein a heavy duty vertical boring mill as used in making tire molds, for example, or other large molds containing concentric depressions or cavities. The mill is of a common type and I have therefore felt it unnecessary to show many of the details, such for example as power means for moving the saddle or head or for rotating the work table. In general, the work table 85 is rotated in desired direction at a preselected uniform speed carrying thereupon the work piece 86 which is to be formed by a single point cutting tool 87 to the desired shape through the dictates of the envelope pattern of the wire 18 as scanned by the pick-up winding 40.

A saddle 88 is vertically positionable along columns 89. A head 90 is horizontally positionable along crossrails 91 on the saddle 88. The head 90 corresponds in general to the cross-slide 8 of the lathe, Fig. 1. Mounted on the head 90 and angularly positionable in a vertical plane is a swivel 92 having a tool carrying ram 93 positioned by the screw 13 from the motor $M^2$. I have indicated that the ram 93 is positioned on the head 90 at about 45 degrees to the horizontal and with the tool 87 engaging the left-hand wall of a generally semi-circular cavity.

The table 85 and work piece 86 are rotated past the single point cutting tool 87. The head 90 is moved at a preselected uniform rate of speed from left to right in the drawing, and during such movement the tool 87 is positioned by the ram 93, through the agency of the screw 13, toward or away from the work table 85 along the angle of inclination of the ram 93 and under the dictates of the envelope pattern of wire 18. Preferably the envelope pattern is so shaped as to produce the desired contour 95 on the work piece down to the greatest depth of the cavity of the mold. As the head 90 moves to the right the pattern controls operation of motor $M^2$ so that the surface 95 is machined to the lowermost point, and thereafter a portion of the pattern is so shaped as to idle the tool 87 along a space incline from the bottom of surface 96, toward the right, to effectively clear the portion 96 of the work piece. Continued travel of the head 90 to the right performs a cutting operation (under the dictates of the pattern) across the surface 97 until the tool reaches a point near the axis of rotation of the table 85 and work piece 86. The operator (or a control 31) then reverses the direction of rotation of the table 85 and work piece 86 while the tool 87 passes over the already machined surface 98 and starts to cut the contour 99 (which is the contour desired 96) under the dictates of the envelope pattern. Continued motion of the head 90 to the right follows the envelope pattern over a space incline to avoid the tool 87 engaging the machined surface 100 (which is the surface 95).

Thus it will be seen that a machining cut is taken across the entire surface of the work piece 86 by one continuous movement of the head 90 from left to right, it being necessary only to reverse direction of rotation of the table 85 and work piece 86 as the tool 87 passes the axis of rotation. During the initial half of its left to right travel the tool 87 machines the surfaces 95, 97, 98, 99 and during the latter half of its left to right movement it machines the surfaces 100, 96. In this manner the only change or adjustment necessary is a reversal of rotation of the table 85 and work piece 86 and this operation is readily accomplished through the program of recording medium 18 and/or the elements 31 and 36 (as seen in Fig. 1). It is not necessary to make any change in the angular position of the compound 92 relative to the carriage 90. Successive roughing and finishing cuts may be taken through prearrangements of the envelope pattern and/or the elements 31, 36.

It is apparent that exactly the same method of operation may be utilized in connection with face plate turning with the lathe of Fig. 1 which should pass the tool completely across the face of the work and change the rotation of the work as the center of rotation is passed. The movement of the head 90 along the rails 91 is continuously uniform at a preselected power feed. The movement of the cross-slide 8 across the carriage 7 (for face plate turning) may be continuously uniform at a preselected power feed.

One particular feature of my invention is in connection with what may be termed as closed cycle operation including a relatively completely automatic cycle of machining operation particularly in a lathe. The normal cutting traverse of the work, by the tool, is followed by a relatively high speed return of the tool to starting position. Such a cycle is completed automatically and the tool stops its travel when it has returned to its initial position and is ready for a second cut (if necessary) over the work, or for a time dwell while the operator removes the finished work piece and replaces it with an unmachined work piece. Additionally the program control may be arranged to make the machine completely automatic whereby the unmachined parts are hopper fed, supported in the centers, machined, and released to a receiving container all completely automatically. The combination of the envelope pattern with the elements 31, 36 will perform such an operation as will be readily apparent to those familiar with the art.

It is equally apparent that such a closed cyle operation may be performed as a combination of mechanical or other limit stops and magnetized wire pattern control. For example the envelope pattern of a moving wire or similar medium may dictate the cutting travel of a lathe tool over a work piece. In combination with this there may be a limit stop provided which, when it is reached by the tool carrier, is actuated to end the travel of the tool in its cutting direction, to bring into play the correct wire pattern dictate for retracting the tool somewhat from the work piece and initiating a rapid return of the tool to its starting position where another travel limit may be engaged. Any or all parts of such a closed cycle operation may be embodied on one or more of the wire patterns or may be embodied in the combination of mechanical stops and wire patterns. Furthermore the sequence of loading and unloading the rough and finished work pieces through the lathe centers may be embodied in envelope patterns or a combination of the same with mechanical movements or limit stops.

In Fig. 9 I show diagrammatically an adaptation of my invention to the measurement and control of temperature in an electric furnace. The general circuit arrangement is disclosed in the copending application of Paul S. Dickey et al. S. N. 71,424 filed January 18, 1949, now Patent No. 2,598,236, granted April 27, 1952, to which reference may be made.

Referring now to Fig. 9, I indicate at 110 a phase sensitive A.-C. bridge having fixed resistor arms 111, 112 and 113. The fourth arm of the bridge 110 is a resistance element 114 located in an electric furnace 115 and sensitive to the temperature thereof. For balancing the network I provide an adjustable resistance 116 having a movable contact arm 117 for proportioning the resistance 116 between the arms 112 and 113.

For positioning the contact arm 117 I provide a motor 118 which also positions an indicator 119 relative to a scale 120 and a revoluble chart 121, thereby providing an instantaneous indication as well as a continuous record of the value of temperature to which the resistance arm 114 is sensitive.

The furnace 115 is preferably heated by electric resistance element 122 receiving current from an A.-C. source 123, which also provides A.-C. supply to the bridge 110 through a transformer 124.

Preferably the bridge arm 114 is a platinum resistance measuring element. The conjugate corners of the bridge 110 are connected to an amplifier 125 and motor control 126 for the motor 118. For an understanding of the phase sensitive A.-C. bridge for measuring the resistance of the leg 114 subjected to temperature of the furnace 115 reference may be had to the Ryder Patents 2,275,317 and 2,333,393. The conjugate voltage supplied to the amplifier 125 assumes a balance or unbalance and a phase relation relative to the supply voltage dependent upon the magnitude and sense of the unbalance condition of the bridge 110. The amplifier 125 selectively controls a pair of motor tubes 127 and 128. The tubes 127, 128 control the amount and direction of unbalance of saturable core reactors 129, 130 for directional and speed control of the capacitor-run motor 118 adapted to position the arms 117 and 119.

The motor 118 is of an A.-C. type having windings 131 and 132 ninety electrical degrees apart and also having a capacitor 133. When alternating current flows directly through one of the windings and simultaneously through the other winding in series with the capacitor, the motor rotates in predetermined direction and at a speed determined by the extent of unbalance of the saturable core reactors 129, 130. It is not necessary to go into greater detail as to the construction and operation of the amplifier 125 and motor control circuit 126, as reference may be had to the above mentioned Ryder patents.

So far I have described a known circuit arrangement for continuously measuring the temperature of the furnace 115 and providing a visual indication thereof upon the index 120 and a continuous record upon the chart 121.

In my present invention additionally I provide a deviation network 140 for continuously comparing the actual value of the temperature or other variable with a desired or standard value or, as in the present case, with a programmed value which is picked off from the wire 18 by the winding 40. The network 140 continuously determines the deviation, if any, between the actual and the desired value of the variable or variables and utilizes such information in continuously using the extent of deviation as a basis for the control of the same or another variable which may or may not contribute to the change or maintenance of the original variable being measured.

Specifically the network 110, 125, 126 is sensitive to the temperature of the furnace 115 at resistance arm 114 for continuously determining such temperature and indicating it upon the index 120 and recording it upon the chart 121. Simultaneously the motor 118 controls the position of a contact arm 141 along a slidewire potentiometer 142 of the deviation network 140.

In this preferred embodiment, I desirably continuously compare the actual temperature at the element 114 with a programmed temperature to be maintained within the furnace 115. Current and/or potential in the loop including the winding 40 and potentiometer 143 is continually compared to current and/or potential in the loop including the secondary of a transformer 144 and the potentiometer 142 which is varied by the position of the contact arm 141. Any unbalance or deviation will show up in the conductors 145, 146, to the amplifier 147, for controlling the heating element 122 to return the actual temperature at the resistance 114 into agreement with the desired temperature dictated by the program element 18.

Reference to Fig. 11 shows the nature of a time-temperature program which may be included upon the wire 18 wherein the temperature of the furnace 115 may be gradually brought to a predetermined value, then the temperature dwell at such value for a certain predetermined length of time and the decay of temperature to follow the same or other desired slope.

In this particular arrangement of Fig. 9, the motor 118 simultaneously positions the contact arms 117, 141 indicative of actual temperature at location 114. Movement of the arm 141 along the potentiometer 142 does not balance any circuit or network including the wires conductors 145, 146 but any balancing of the deviation circuit occurs only when the temperature within the furnace 115 has been returned to a value predicated by the wire 18 and shown up as the position of the arm 141 along the resistance 142.

In Fig. 10 I illustrate diagrammatically a further arrangement for program control of temperature within a heated container 150. The container 150 may be supplied with a heating fluid through a conduit 151 under the control of a regulating valve 152. Temperature within the container 150 is effective upon the bulb 153 of a filled-system including the bulb 153, a capillary 154 and a Bourdon tube 155; the latter arranged to have its free end position one end of a lever 156 as temperature within the container 150 varies. For example, if the temperature at location 153 increases then the free end of the Bourdon tube 155 will tend to rotate counterclockwise thus moving the lever 156 in a clockwise direction and raising the stem 157 of a pneumatic pilot valve 158. The latter controls a fluid pressure within a pipe 159 for positioning the regulating valve 152. Thus, assuming that the right-hand end of the lever 156 is stationary, an increase in temperature within the container 150 will call for a closing of the valve 152 while a decrease in temperature of the container 150 will call for an opening of the valve 152. Such action would serve to compare the actual temperature (position of the Bourdon tube 155) with a prefixed standard temperature (position of the right-hand end of lever 156).

Additionally the present invention controls the right-hand of the lever 156 to position the same along a programmed path so that the position of the pilot stem 157 becomes a measure of deviation of actual temperature from programmed temperature which is desired to maintain within the container 150.

A program wire 18 has a sensitive feeler winding 40 feeding an amplifier 150 which controls the direction and amount of rotation of a motor 161 for positioning the right-hand end of the lever 156 and simultaneously positioning a contact arm 162 along the balancing potentiometer 163. The arrangement may produce a temperature-time program within the container 150 of nature for example like that shown in Fig. 11.

While I have chosen to illustrate and describe certain preferred arrangements and embodiments of my invention it will be understood that these are by way of illustration only and are not to be considered as limiting.

For example, I have chosen to describe particularly that the magnetic storage media are in the nature of circular wires. It will be appreciated that such media may be in fact metallic tape or paper tape with metallic coating or similar elongated magnetic storage media. Furthermore, that a multiplicity of programs or cams may be stored in various lanes on a tape or similar media and, in known fashion, a plurality of pick-up or feeler heads may be properly located adjacent to different channels of such a tape.

What I claim as new and desire to secure by Letters Patent of the United States, is:

1. Apparatus for controlling a lathe by relatively moving the tool and work piece, including in combination, an electric motor adapted to rotate the work piece, a second electric motor adapted to move the tool transversely relative to the work piece, a third electric motor adapted to move the tool longitudinally relative to the work piece, an elongated medium susceptible to receiving three magnetic patterns of desired motor operation related to time, means individually sensitive to said patterns located adjacent the medium, a control device for each motor, apparatus connecting each said means to one of said control devices for controlling the motors, and means for moving the medium past the sensitive means at preselected speed, said control devices for some of said motors combining speed and directional control means, said directional control means including a self-balancing circuit element driven by the controlled motor.

2. A motor control circuit, in combination, an electric motor, a source of power for said motor, a magnetized medium of considerable length having a pattern of magnetism along its length, a sensing head adjacent the medium and having an electrical output, means for moving the medium at preselected speed past the sensing head, circuit means controlled by the sensing head output for connecting the motor to the source of power, said last mentioned means including circuit components opposing said output and biased to correspond to a predetermined pattern cross-sectional output magnitude, said motor being arranged for rotation in one direction with greater magnitude of bias to output and in the other direction with lesser magnitude, motor speed varying with said magnitude in either direction.

3. Apparatus for controlling a lathe by relatively moving the tool and work piece, including in combination, means arranged to travel the tool longitudinally of the work piece at a preselected uniform speed, means adapted to rotate the work piece at a preselected uniform speed, an electric motor carried longitudinally with the tool and adapted to move the tool toward or away from the work piece along a path of less than 90 degrees to the axis of the work piece, circuit means controlling the motor and thus the direction and speed of movement of the tool along said path, an elongated magnetizable medium having a preapplied envelope of magnetism of patterned cross-sectional magnitude along the length of the medium representing time, means for moving said medium at a preselected speed relative to a fixed location, and a sensing means at said location responsive to the envelope magnitude passing thereby and dictating to the circuit means.

4. The combination of claim 3 wherein the path is 45 degrees.

5. Apparatus arranged to control the operation of a vertical boring mill to form a work piece to conform to a preselected shape, including in combination, means adapted to rotate the work piece at a preselected speed, means adapted to move the tool across the work piece along a path passing through its center of rotation, an electric motor carried with the tool along said path and arranged to move the tool toward or away from the work piece along a second path less than 90 degrees from said first path, a source of power for the motor, program means controlling the direction and amount of movement of the tool by the motor, said program means including an elongated medium having an envelope of magnetism shaped in accordance with program-time, a sensing head, means to move the medium at a preselected speed past the head, circuit means controlled by said head for connecting the motor to the source of power, and means to reverse direction of rotation of the work piece as the tool crosses the axis of rotation in its unidirectional travel along the first path.

6. Apparatus adapted to control a variable quantity, quality, position or the like, including in combination, an elongated program medium having a pattern of magnetism varying solely in intensity shaped along its length according to desired value-time relation, means for moving the medium past a location at preselected speed, a device at said location sensitive solely to the magnitude of the pattern as it passes the location and adapted to generate a potential representative thereof, means opposing said potential and a bias voltage, means amplifying the potential differences, a motor arranged to regulate said variable, and control means for said motor responsive to the output of said amplifying means.

7. The combination of claim 6 including means determining the actual value of the variable, and circuit means continuously comparing the program value with the actual value, said circuit means also affecting the control means.

8. The combination of claim 7 wherein the control means is arranged to regulate the variable in accordance with departure of actual value from the program variable.

9. A temperature control system including in combination, means adapted to regulate the temperature, measuring means continuously determining the actual value of the temperature, an elongated magnetizable medium having a pattern of magnetism shaped to a temperature-time program, means for moving the medium past a location at a preselected speed, a device at said location sensitive to the magnitude and shape of the pattern as it passes the location, a deviation circuit continually comparing the actual with the desired value at said location, and means responsive to the deviation circuit controlling the regulating means.

10. A temperature control system including in combination, regulating means for the temperature, means continually determining the actual value of the temperature, means representing the standard temperature to be maintained, control means for the regulating means jointly responsive to the determining means and the standard means, and program means for setting the standard, said program means comprising an elongated medium having a pattern of magnetism shaped to a desired time-standard pattern, means for moving the medium past a location at preselected speed, and a device at said location sensitive to the magnitude and shape of the pattern as it passes the location, said device being connected to said control means.

11. Apparatus for controlling a lathe by relatively moving the tool and rotating workpiece, including in combination, a motor for advancing and retracting the tool, an energized potentiometer positioned by said motor, a reversing and speed controller for said motor, means providing a control signal for determining the speed and direction of rotation of said motor, circuit means opposing said signal and the potentiometer output, said controller being energized by the direction and magnitude of the potential difference in said circuit, said signal providing means comprising an elongated medium having an envelope of magnetism forming a machining pattern therealong, means sensitive to the envelope magnetism at any location along the medium, and means for progressively moving the medium past the sensitive means.

12. The apparatus as defined in claim 11 wherein said last mentioned means is an electric motor, a program selector for said motor comprising a stop and start control for the motor, a belt having control features thereon representative of said program, and means moving said belt to progressively actuate said control by successive features.

13. The apparatus as defined in claim 11 wherein said last mentioned means include a motor and reverse means for said medium, programming means for said last mentioned motor and reverse means comprising a constantly driven endless flexible element having motor start and stop and reverse means position indicators thereon, and mechanism cooperating with said indicators to control the motor start and stop and the reverse means.

14. The apparatus as defined in claim 11 wherein the lathe is provided with a second motor adapted for constant directional rotation of the lead screw thereof during a cutting operation, and speed control means for said second motor comprising current regulating mechanism inversely under the control of the speed control device for the first motor on the lathe and independent of the direction of rotation of the first motor.

15. The apparatus of claim 1 wherein the elongated medium is in tape form and has three parallel magnetic pattern lanes.

16. The apparatus of claim 1 wherein the elongated medium comprises three separate strands each comprising a magnetic pattern lane.

References Cited in the file of this patent

UNITED STATES PATENTS

| Number | Name | Date |
|---|---|---|
| 2,213,108 | Pollard | Aug. 27, 1940 |
| 2,275,317 | Ryder | Mar. 3, 1942 |
| 2,310,955 | Hornfeck | Feb. 16, 1943 |
| 2,423,440 | DeNeergaard | July 8, 1947 |
| 2,475,245 | Leaver | July 5, 1949 |
| 2,511,956 | Wetzel | June 20, 1950 |
| 2,537,770 | Livingston | Jan. 9, 1951 |